(12) United States Patent
Swanick et al.

(10) Patent No.: US 6,396,431 B1
(45) Date of Patent: May 28, 2002

(54) PRECISION MICROWAVE/MILLIMETER WAVE MODULATED SIGNAL SOURCE

(75) Inventors: David J. Swanick, Wakefield, RI (US); Gautam Misra, Chelmsford, MA (US); Kichul Cho, North Kingstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/391,881

(22) Filed: Sep. 7, 1999

(51) Int. Cl.[7] .............................................. H02K 23/00
(52) U.S. Cl. ...................... 341/177; 455/115; 370/205; 324/458; 324/527
(58) Field of Search .......................... 341/177; 455/115, 455/102; 370/205, 212; 324/458, 527

(56) References Cited

U.S. PATENT DOCUMENTS

| | | | | |
|---|---|---|---|---|
| 3,921,085 A | * | 11/1975 | Keane | 329/322 |
| 4,078,255 A | * | 3/1978 | Evans | 331/78 |
| 4,127,819 A | * | 11/1978 | Keane | 331/9 |
| 4,342,008 A | * | 7/1982 | Jewett | 331/178 |
| 4,425,515 A | * | 1/1984 | Larson | 327/116 |
| 4,613,821 A | * | 9/1986 | Sternberg et al. | 324/323 |
| 5,572,213 A | * | 11/1996 | Noneman et al. | 342/13 |
| 5,963,581 A | * | 10/1999 | Fullerton et al. | 375/131 |
| 5,995,534 A | * | 11/1999 | Fullerton et al. | 375/146 |

* cited by examiner

Primary Examiner—Michael Horabik
Assistant Examiner—Albert K. Wong
(74) Attorney, Agent, or Firm—Michael J. McGowan; Michael F. Oglo; Prithvi C. Lall

(57) ABSTRACT

The precision microwave/millimeter wave modulated signal source is a relatively low cost, compact, highly accurate and stable signal source covering the 2 to 40 Gigahertz frequency range. The pulse width and amplitude level of the output signal can be changed on every pulse in the signal pulse train. Pulse width range is 5 nanoseconds to 1 millisecond. Pulse repetition intervals can be changed between each pulse set with usable range from 10 nanoseconds to 100 milliseconds. Interval parameters can be adjusted with 1 nanosecond resolutions with stabilities of +/−200 picoseconds. The highly accurate and versatile selection of signal parameters, along with its compact size, makes this design useful as an embedded built in test signal source. This built in signal source can be used for verification of system performance for many electronic warfare systems.

21 Claims, 2 Drawing Sheets

PRECISION MICROWAVE/MILLIMETER WAVE MODULATED SIGNAL SOURCE

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates to a variable frequency signal generator.

(2) Description of the Related Art

Previously, to perform injected signal measurements to verify system performances required multiple bulky pieces of expensive test equipment. This equipment often would not easily provide the pulse to pulse parameter agility with the accuracy and stability offered by the invention described herein.

SUMMARY OF THE INVENTION

The precision microwave/millimeter wave modulated signal source of the invention is a relatively low cost, compact, highly accurate and stable signal source covering the 2 to 40 Gigahertz (GHz) frequency range. The pulse width and amplitude level of the output signal can be changed on every pulse in the signal pulse train. Pulse width range is 5 nanoseconds to 1 millisecond. Pulse repetition intervals can be changed between each pulse set with usable range from 10 nanoseconds to 100 milliseconds. Interval parameters can be adjusted with 1 nanosecond resolutions with stabilities of +/−200 picoseconds. The highly accurate and versatile selection of signal parameters, along with its compact size, makes this design useful as an embedded built in test signal source. This built in signal source can be used for verification of system performance for many electronic warfare systems.

The invention outputs precision microwave/millimeter wave modulated signals to various. frequency bands. The source of radio frequency (RF) is a miniature oscillator that injects a low frequency at high power. This output is fed into a step recovery diode that generates many combed output frequencies. This spectrum is then modulated by a programmed high precision pulse repetition interval (PRI) signal coming from a circuit board containing pulse characteristics as small as 1 nanosecond (s) pulsewidth. One frequency picket at a time is filtered by a yttrium iron garnet (YIG) filter and appropriate attenuation is set by a digitally variable attenuator to yield the desired precision microwave/millimeter modulated signals.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals refer to like parts and wherein.

BRIEF DESCRIPTION OF THE PREFERRED EMBODIMENT

The preferred embodiment of the invention is discussed. While specific part numbers, implementations, and configurations are discussed, it should be understood that this is done for illustration purposes only. A person skilled in the relevant art will recognize that other components, implementations, and configurations may be used without departing from the spirit and scope of the invention.

Figure 1:
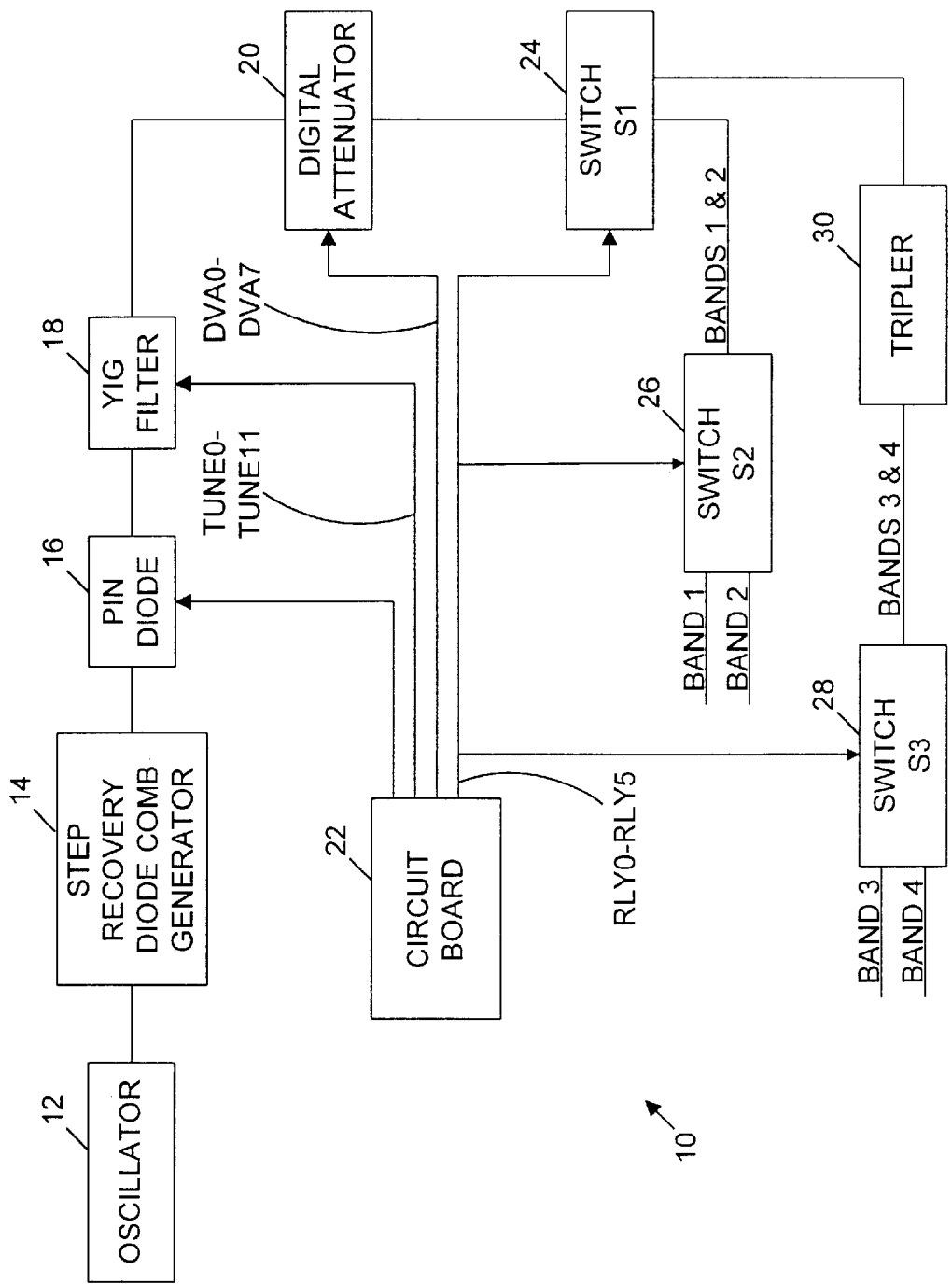
FIG. 1 is a block diagram of the overall system.

With reference to FIG. 1, signal source generator 10 outputs RF test signals to various frequency bands. A miniature oscillator 12 injects a low frequency at high power. This output is fed into a step recovery diode 14 which generates many combed output frequencies. In the disclosed embodiment, oscillator 12 is a 500 megahertz (MHZ) oscillator with 30 dBm output power, and step recovery diode 14 is a 500 MHZ step recovery diode. The output of step recovery diode 14 is a spectrum of frequencies from 2–18 GHz, with 500 MHZ apart comb pickets. This spectrum is then modulated with desired PRI by p-type intrinsic n-type (PIN) diode 16. The output is a broad band spectrum of variable width pulses and variable pulse repetition intervals. One frequency picket at a time is filtered by YIG filter 18. A digitally variable attenuator 20 is then applied to set the appropriate attenuation for each pulse of the output signal.

The present invention uses three relays 24, 26, and 28 to switch between four RF paths (Bands 1, 2, 3 and 4). Relay 24 switches the signal between Bands 1 and 2 and Bands 3 and 4. Relay 26 further routes the signal between Band 1 (2–8 GHz) and Band 2 (8–18 GHz). Relay 28 further routes the signal between Band 3 (18–26.5 GHz) and Band 4 (27–39 GHz). To achieve these higher frequencies with the preferred embodiment, tripler 30 is used to take regular 6–13 GHz pickets and obtain 18–39 GHz (i.e., three times the value of the lower frequency).

Figure 2:
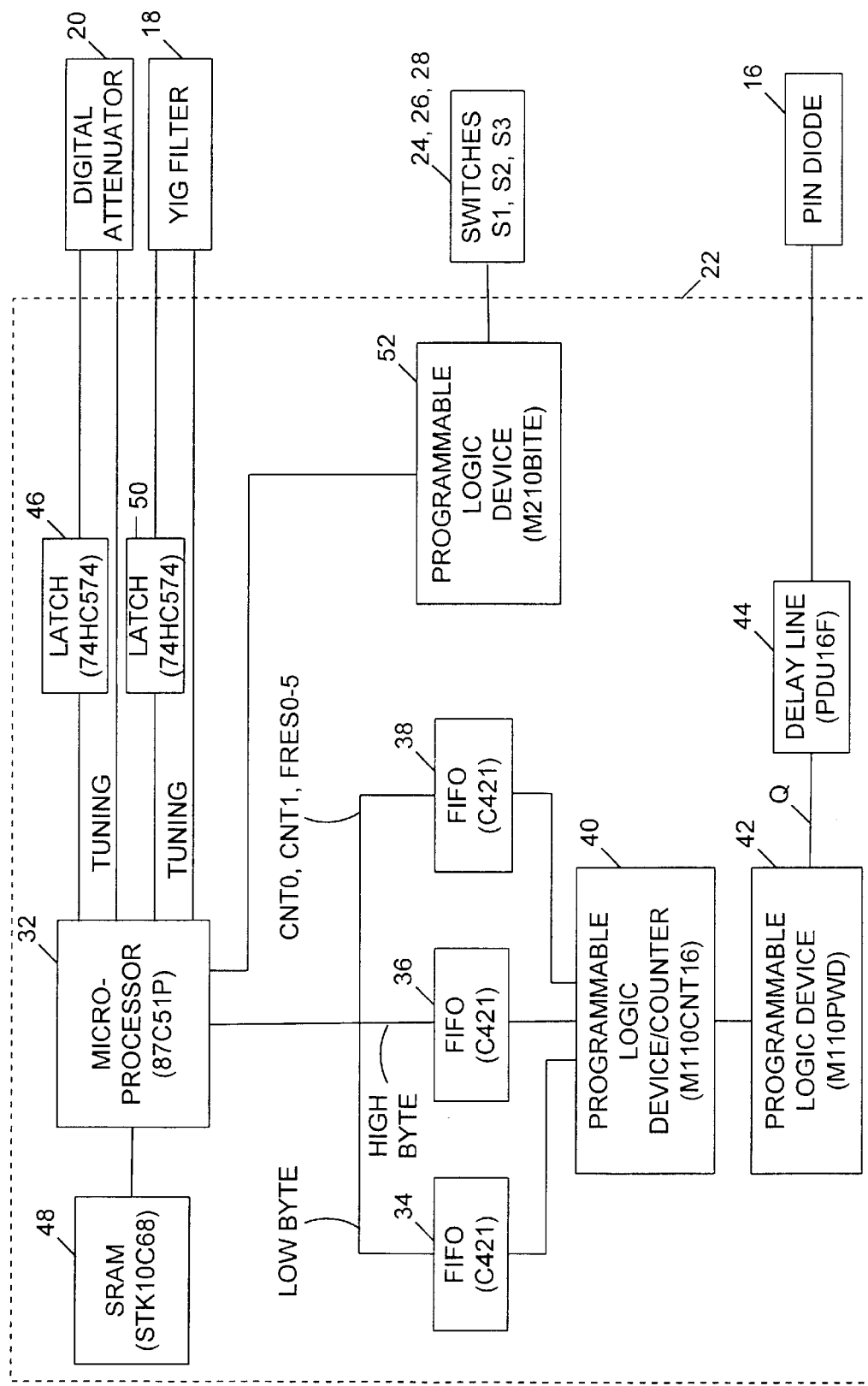
FIG. 2 is a block diagram of the circuit board.

With reference also to FIG. 2, all the controls to the RF components in the present invention come from circuit board 22. Part numbers are shown in parentheses on FIG. 2 for illustrative purposes only. A person skilled in the art will recognize that other parts may be substituted and still be within the scope of the present invention.

With power supplied to circuit board 22, it accomplishes the following tasks:

a. Output attenuation control DVA0–DVA7 to attenuator 20;

b. Output YIG tuning control TUNE0–TUNE11 to YIG filter 18;

c. Output relay control RLY0–RLY5 to relays 24, 26, and 28;

d. Output high precision PRI with pre-programmed pulse characteristics as small as 10 ηs pulsewidth to PIN diode 16; and e. Capability of tuning digital annentuator 20 and YIG filter 18.

In operation of the present invention, circuit board 22 is directed to accomplish its tasks by a microprocessor 32, which is programmed to either a routine of generating test signals or a routine to adjust attenuation and YIG filter hysterisis. In the first routine, the RF output is modulated according to the pre-programmed PRI, and in the second routine the frequencies are passed as continuous wave (CW). To generate pulses, the program describes pulse characteristics in time, such as a pulse is on or high for 200 $\mu$s and then it is off or low for 5 $\mu$s. At the time of execution, this information is loaded into a set of first-in, first-out memories 34, 36, and 38 (FIFOs). FIFOs 34, 36, and 38 are basically a table of pulse descriptions from which one line at a time is provided to a programmable logic device 40. Device 40 functions as a highly accurate and reliable counter. Programmable logic device 42 receives time intervals from the counter (device 40) to output a pulse where the output Q is appropriately high or low. Additional precision to the pulse characteristics is added by delay line 44, which defines pulses to the accuracy of 1 ηs.

For any given test signal, circuit board 22 has the capability to add more attenuation to any RF test signal. The attenuation is controlled by writing an 8-bit value (DVA0–DVA7) to latch 46, which latches the value for digital attenuator 20. This value can be adjusted for every picket and the desirable power level can be obtained. Here, every bit adds 0.25 dB attenuation, thus 0xFF gives the maximum attenuation step of 32 dB. If a constant power level of, say, −50 dB is desired for all then all the pickets can be lowered to −50 dB, one by one, when a picket is filtered. Circuit board 22 also implements the capability to store the desired attenuation settings in a static random access memory 48 (SRAM) table which can be recalled for any pre-programmed configuration.

The circuit board 22 is also capable of tuning the YIG filter 18. There are two issues with YIG filter 18. The first is parking YIG filter 18 around a desired picket frequency, and the second is making necessary adjustment for any frequency drift caused by temperature, linearity and hysterisis. Parking of YIG filter 18 is predetermined for the designed unit by 12-bit values. (TUNE0–TUNE11) where 0xFFF–0x000 covers 2–18 GHz. Since pickets out of comb generator 14 are 500 MHZ apart, a value of 0xF7F moves YIG filter 18 to 2.5 GHz, and a value of 0xEFF takes it to 3.0 GHz and so on. This tuning is accomplished by writing TUNE0–TUNE7 to a latch 50 and TUNE8–TUNE11 to programmable logic device 52 that provides four latched lines for the four most significant bits (MSB) of tuning word.

The second issue regarding the frequency drift is solved by adding an 8-bit offset value to the tuning word. This offset can slightly move the filter either to the right or left of the predetermined parked frequency, depending on positive or negative offset value. Here 0x01 offset adjusts the drifted frequency to approximately 0.04 MHZ and 0x1B offset adjusts to 1 MHZ. Circuit board 22 also implements the capability to store the desired offset settings in SRAM 48 table which can be recalled for any pre-programmed configuration.

Device 52 provides five latched lines to switch relays 24, 26, and 28 from either normally closed position to normally open path. The designed unit uses three relay lines RLY0–RLY2 at relay 24 to first split 2–18 GHz signals from 18–39 GHz which comes from tripled 6–13 GHz. Relays 26 and 28 split 2–8 GHz from 8–18 GHz; and 18–26.5 GHz from 26–40 GHz. These relays are set appropriately by microprocessor 32 according to wherever YIG filter 18 is tuned.

Any complex pulse description can be characterized by following intervals of on or off periods:

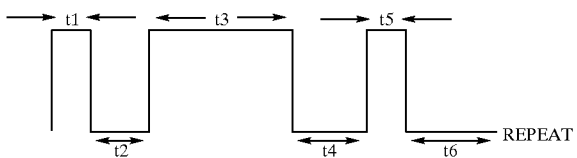

where, for example t1=120 ηs is the time interval that the first pulse is on or high;

t2=500 ηs is the time interval that the first pulse is out or low;

t3=368 ηs is the time interval that the second pulse is on or high;

t4=1 μs is the time interval that the second pulse is off or low;

t5=12 ηs is the time interval that the third pulse is on or high; and t6=3 μs is the time interval that the third pulse is off or low.

And, after (120 ηs+500 ηs+368 ηs+1 μs+12 ηs+3 μs)=5 μs, the sequence is repeated.

Using these characteristics, the FIFO table can be filled. The time intervals can be translated into a binary number, where an integer of two 8-bit words define a value of 50 ηs/bit with fine resolution defined by a 6-bit word with a value of 1 ηs/bit. The FIFO table also keeps track of the on or off state by a control bit. Another control bit determines the end of the table from where the pulses are to repeat themselves, resulting in a pulse repetition frequency.

The FIFO table contains the following:

| Time Int. | CNT 0 | CNT 1 | FRES 0–5 (fine res) | HIGH BYTE | LOW BYTE |
|---|---|---|---|---|---|
| | 0=more entry | 0=off state | all zeros = no fine res. | all ones = no high byte | all ones = no low byte |
| | 1=end of table | 1=on state | 1 ηs/bit | 50 ηs/bit (D8–D15) | 50 ηs/bit (D0–D7) |
| t1 120 ηs ON | 0 | 1 | 01 0011 | 1111 1111 | 1111 1101 |
| t2 500 ηs OFF | 0 | 0 | 00 0000 | 1111 1111 | 1111 0110 |
| t3 368 ηs ON | 0 | 1 | 01 0001 | 1111 1111 | 1111 1001 |
| t4 1 μs OFF | 0 | 0 | 00 0000 | 1111 1111 | 1110 1100 |
| t5 12 ηs ON | 0 | 1 | 00 1100 | 1111 1111 | 1111 1111 |
| t6 3 μs OFF EOT Repeat | 1 | 0 | 00 0000 | 1111 1111 | 1100 1000 |

In the circuit of the present invention, the LOW BYTE values are passed to FIFO 34, HIGH BYTE values are passed to FIFO 36, and CNT 0, CNT 1, FRES 0–5 values are passed to FIFO 38. Device 40 is a 16-bit counter that counts up to 0xFF and receives next timing interval from FIFOs 34, 36, and 38. Device 42 keeps track of the output pulse, Q, being high or low through a flip-flop (not shown, e.g., 74AC74). If any fine resolution component is to be added to the pulse characteristic, delay line 44 counts down to 0x00; and the delay is combined by a NOR gate (not shown, e.g., 74F02) for the flip-flop.

The present invention also provides for capability of tuning digital attenuator 20 and YIG filter 18 for any unique output at the end. Four control lines allow the manipulation of the microprocessor, from which one can write to SRAM 48. The values for attenuation and YIG offset can be stored and recalled for desired output power level and for adjustments to the YIG hysterisis. Two of the lines provide unlimited programming capability via serial communication with the microprocessor.

The precision microwave/millimeter wave modulated signal source is a relatively low cost, compact, highly accurate and stable signal source covering the 2 to 40 GHz frequency range. The highly accurate and versatile selection of signal parameters along with its compact size makes this design useful as an embedded built in test signal source.

It will be understood that many additional changes in the details, materials, steps, and arrangement of parts, which have been herein described and illustrated in order to explain the nature of the invention, may be made by those skilled in the art within the principle and scope of the invention as expressed in the appended claims.

What is claimed is:

1. An apparatus for producing a high frequency pulse modulated output signal, comprising:
    a signal generator for producing a broad-band radio frequency signal comprised of a plurality of discrete frequencies;
    a modulator for modulating said broad-band radio frequency signal using a control signal to produce a plurality of pulse modulated discrete frequency signals, said control signal representing a desired signal pulse train; and
    means for selecting one of said plurality of pulse modulated discrete frequency signals as the output signal.

2. The apparatus of claim 1 wherein said signal generator comprises:
    an oscillator for producing a base frequency signal; and
    a step recovery diode for receiving said base frequency signal and for producing said broad-band radio frequency signal.

3. The apparatus of claim 2 wherein said step recovery diode is a comb generator for producing each of said plurality of discrete frequencies.

4. The apparatus of claim 1 wherein said modulator comprises a PIN diode.

5. The apparatus of claim 4 further comprising a microprocessor for producing said control signal based on a desired signal pulse train, said microprocessor providing said control signal to said PIN diode to control pulse modulation of said broad-band radio frequency signal.

6. The apparatus of claim 1 wherein said selecting means comprises a YIG filter.

7. The apparatus of claim 6 wherein said selecting means further comprises a microprocessor for controlling said YIG filter to select one of said plurality of pulse modulated discrete frequencies as the output signal.

8. The apparatus of claim 7 wherein said microprocessor further controls frequency drift of said selected one of said frequencies.

9. The apparatus of claim 5 wherein said selecting means comprises a YIG filter, said microprocessor controlling said YIG filter to select one of said plurality of pulse modulated discrete frequencies signals as the output signal.

10. The apparatus of claim 9 wherein said microprocessor is part of a microprocessor circuit, said microprocessor circuit further comprising:
    a plurality of FIFO memories receiving signals from said microprocessor;
    a series of programmable logic devices, said plurality of FIFO memories feeding said series of programmable logic devices, one of said programmable logic devices providing said control signal to said PIN diode.

11. The apparatus of claim 1 further comprising a digital attenuator.

12. The apparatus of claim 11 further comprising a microprocessor for controlling said digital attenuator to attenuate the high frequency pulse modulated output signal.

13. The apparatus of claim 12 wherein the high frequency pulse modulated output signal is comprised of a plurality of pulses, each of said pulses being attenuated individually and independently.

14. The apparatus of claim 1 wherein said plurality of pulse modulated discrete frequency signals is comprised of a plurality of pulses and a corresponding plurality of intervals, each of said plurality of pulses having a pulse duration, said pulse duration being a pulse width, each of said plurality of intervals having an interval duration, said interval duration being a pulse repetition interval, wherein:
    said modulator modulates said broad band radio frequency signal such that said pulse width of each of said pulses is individually and independently variable; and
    said modulator modulates said broad band radio frequency signal such that said pulse repetition interval of each of said intervals is individually and independently variable.

15. The apparatus of claim 14 wherein:
    said pulse width has a range between 5 nanoseconds and 1 millisecond with 1 nanosecond resolution; and
    said pulse repetition interval has a range between 10 nanoseconds and 100 milliseconds with 1 nanosecond resolution.

16. A method for producing a high frequency pulse modulated output signal, comprising:
    generating a broad-band radio frequency signal comprised of a plurality of discrete frequencies;
    modulating said broad-band radio frequency signal using a control signal to produce a plurality of pulse modulated discrete frequency signals, said control signal representing a desired signal pulse train; and
    selecting one of said plurality of pulse modulated discrete frequencies signals as the output signal.

17. The method of claim 16 wherein said generating step comprises:
    providing a base frequency signal; and
    receiving said base frequency signal and producing said broad-band radio frequency signal.

18. The method of claim 16 further comprising controlling frequency drift of said selected one of said frequencies.

19. The method of claim 16 further comprising attenuating the high frequency pulse modulated output signal.

20. The method of claim 19 wherein said attenuating step attenuates, individually and independently, each of a plurality of pulses of the high frequency pulse modulated output signal.

21. The method of claim 16 wherein each of said plurality of pulse modulated discrete frequency signals is comprised of a plurality of pulses and a corresponding plurality of intervals, each of said plurality of pulses having a pulse duration, said pulse duration being a pulse width, each of said plurality of intervals having an interval duration, said interval duration being a pulse repetition interval, the method further comprising:
    modulating said pulse width of each of said pulses individually and independently; and
    modulating said pulse repetition interval of each of said intervals individually and independently.

* * * * *